United States Patent
Shi et al.

(10) Patent No.: US 8,103,054 B2
(45) Date of Patent: Jan. 24, 2012

(54) METHOD FOR IDENTIFYING MARKED IMAGES USING STATISTICAL MOMENTS BASED AT LEAST IN PART ON A JPEG ARRAY

(75) Inventors: Yun-Qing Shi, Millburn, NJ (US); Chunhua Chen, Harrison, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 0 days.

(21) Appl. No.: 12/897,505

(22) Filed: Oct. 4, 2010

(65) Prior Publication Data

US 2011/0019907 A1  Jan. 27, 2011

Related U.S. Application Data

(63) Continuation of application No. 11/331,766, filed on Jan. 13, 2006, now Pat. No. 7,822,223.

(51) Int. Cl.
*G06K 9/00* (2006.01)
(52) U.S. Cl. ..................... 382/100; 713/176
(58) Field of Classification Search .............. 382/100, 382/232; 380/54, 210, 252, 287; 713/176; 704/200.1, 273; 381/73.1; 348/460, 463
See application file for complete search history.

(56) References Cited

U.S. PATENT DOCUMENTS

| | | | | |
|---|---|---|---|---|
| 5,592,225 A * | 1/1997 | Kurobe | | 375/240.03 |
| 5,946,044 A * | 8/1999 | Kondo et al. | | 348/458 |
| 6,014,468 A * | 1/2000 | McCarthy et al. | | 382/254 |
| 6,134,348 A * | 10/2000 | Nakaya et al. | | 382/224 |
| 6,175,650 B1 | 1/2001 | Sindhu et al. | | |
| 6,222,932 B1 | 4/2001 | Rao et al. | | |
| 6,272,178 B1 * | 8/2001 | Nieweglowski et al. | | 375/240.03 |
| 6,363,119 B1 | 3/2002 | Oami | | |
| 6,473,533 B1 * | 10/2002 | Yokose et al. | | 382/248 |
| 6,618,439 B1 * | 9/2003 | Kuo et al. | | 375/240.16 |
| 6,816,847 B1 | 11/2004 | Toyama | | |
| 2002/0122596 A1 | 9/2002 | Bradshaw | | |
| 2003/0128877 A1 | 7/2003 | Nicponski | | |
| 2003/0235341 A1 | 12/2003 | Gokturk et al. | | |
| 2005/0036649 A1 | 2/2005 | Yokono et al. | | |
| 2005/0058356 A1 * | 3/2005 | Shen et al. | | 382/238 |
| 2005/0102246 A1 | 5/2005 | Movellan et al. | | |
| 2005/0126505 A1 | 6/2005 | Gallager et al. | | |
| 2005/0196031 A1 | 9/2005 | Hsieh et al. | | |
| 2006/0140455 A1 | 6/2006 | Costache et al. | | |
| 2006/0147107 A1 | 7/2006 | Zhang et al. | | |
| 2007/0189608 A1 | 8/2007 | Shi et al. | | |

OTHER PUBLICATIONS

PCT International Search Report and International Preliminary Report on Patentability issued in International Application No. PCT/US06/01438, on Sep. 3, 2008.
Hanghang Tong, Classification of Digital Photos Taken by Photographers or Home Users, Oct. 29, 2004, Springer, pp. 198-205.
"Steganalysis Based on Moments of Characteristic Functions Using Wavelet Decomposition, Prediction-Error Image, and Neural network," by Yung Q. Shi et al., International Conference on Multimedia and Expo, Amsterdam, Netherlands 2005.

(Continued)

*Primary Examiner* — Anand Bhatnagar
(74) *Attorney, Agent, or Firm* — Connolly Bove Lodge & Hutz LLP

(57) ABSTRACT

Briefly, embodiments of a method of identifying marked images, in which higher order statistical moments based at least in part on a JPEG array are employed, is described.

36 Claims, 2 Drawing Sheets

OTHER PUBLICATIONS

"Feature-Based Steganalysis for JPED Images and its Implications for Future Design of Steganographic Schemes," by Jessica Fridrich, 6th International Workshop, IH 2004 Toronto, Canada, May 2004.

The Notice of Reasons for Rejection issued in related Japanese Application No. 2008-550285, with its English language translation.

* cited by examiner

METHOD FOR IDENTIFYING MARKED IMAGES USING STATISTICAL MOMENTS BASED AT LEAST IN PART ON A JPEG ARRAY

CROSS-REFERENCE TO RELATED APPLICATION

This application is a continuation of co-pending U.S. patent application Ser. No. 11/331,766, filed on Jan. 13, 2006, the contents of which are expressly incorporated herein by reference in their entirety.

FIELD

This application is related to classifying or identifying content, such as marked images, for example.

BACKGROUND

In recent years digital data hiding has become an active research field. Various kinds of data hiding methods have been proposed. Some methods aim at content protection, and/or authentication, while some aim at covert communication. The latter category of data hiding is referred to here as steganography.

BRIEF DESCRIPTION OF THE DRAWINGS

Subject matter is particularly pointed out and distinctly claimed in the concluding portion of the specification. Claimed subject matter, however, both as to organization and method of operation, together with objects, features, and/or advantages thereof, may best be understood by reference of the following detailed description if read with the accompanying drawings in which:

DETAILED DESCRIPTION

Figure 1:
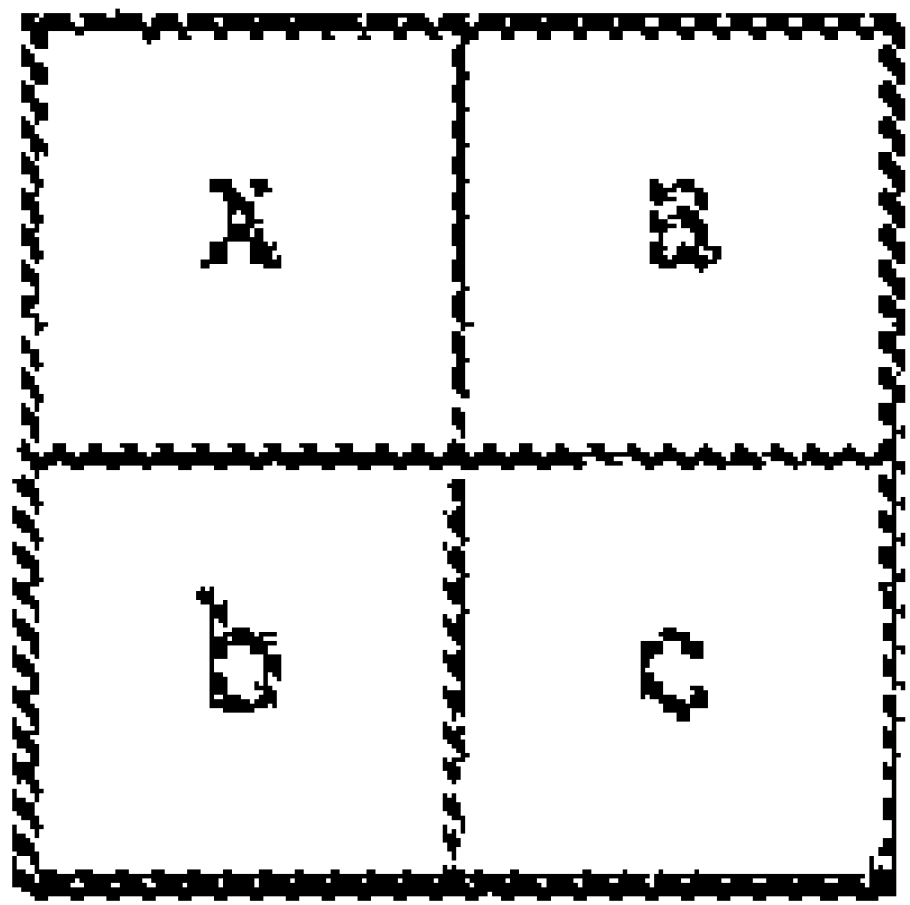
FIG. 1 is a schematic diagram illustrating one embodiment of a 2 by 2 array of pixels.

In the following detailed description, numerous specific details are set forth to provide a thorough understanding of claimed subject matter. However, it will be understood by those skilled in the art that claimed subject matter may be practiced without these specific details. In other instances, well known methods, procedures, components and/or circuits have not been described in detail so as not to obscure claimed subject matter.

Some portions of the detailed description which follow are presented in terms of algorithms and/or symbolic representations of operations on data bits and/or binary digital signals stored within a computing system, such as within a computer and/or computing system memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing may involve physical manipulations of physical quantities. Typically, although not necessarily, these quantities may take the form of electrical and/or magnetic signals capable of being stored, transferred, combined, compared and/or otherwise manipulated. It has proven convenient, at times, principally for reasons of common usage, to refer to these signals as bits, data, values, elements, symbols, characters; terms, numbers, numerals and/or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing", "computing", "calculating", "determining" and/or the like refer to the actions and/or processes of a computing platform, such as a computer or a similar electronic computing device, that manipulates and/or transforms data represented as physical electronic and/or magnetic quantities and/or other physical quantities within the computing platform's processors, memories, registers, and/or other information storage, transmission, and/or display devices.

Owing to the popular usage of JPEG images, steganographic tools for JPEG images emerge increasingly nowadays, among which model based steganography (MB), F5 and OutGuess are the most advanced. However, it continues to be desirable to develop new tools to identify images that include hidden data. In accordance with claimed subject matter, one embodiment described herein includes a method based at least in part on statistical moments derived at least in part from an image 2-D array and a JPEG 2-D array. In this particular embodiment, a first order histogram and/or a second order histogram may be employed, although claimed subject matter is not limited in scope in this respect. For example, higher order histograms may be utilized in other embodiments, for example. However, continuing with this particular embodiment, from these histograms, moments of 2-D characteristic functions are also used, although, again, other embodiments are not limited in this respect. For example, higher order moments may be employed.

The popularity of computer utilization accelerates the wide spread use of the Internet. As a result, millions of pictures flow on the Internet everyday. Nowadays, the interchange of JPEG (Joint Photographic Experts Group) images becomes more and more frequent. Many steganographic techniques operating on JPEG images have been published and have become publicly available. Most of the techniques in this category appear to modify an 8×8 block discrete cosine transform (BDCT) coefficients in the JPEG domain to embed hidden data. Among the steganographic techniques, the recent published schemes, OutGuess, F5, and the model-based steganography (MB) appear to be the most advanced. See, N. Provos, "Defending against statistical steganalysis," 10*th USENIX Security Symposium*, Washington D.C., USA, 2001; A. Westfeld, "F5 a steganographic algorithm: High capacity despite better steganalysis," 4*th International Workshop on Infor-mation Hiding*, Pittsburgh, Pa., USA, 2001; P. Sallee, "Model-based steganography," *International Workshop on Digital Watermarking*, Seoul, Korea, 2003. OutGuess embeds the to-be-hidden data using redundancy of the cover image. In this context, the cover image refers to the content without the hidden data embedded. For JPEG images, OutGuess attempts to preserve statistics based at least in part on the BDCT histogram. To further this, OutGuess identifies redundant BDCT coefficients and embeds data into these coefficients to reduce effects from data embedding. Furthermore, it adjusts coefficients in which data has not been embedded to attempt to preserve the original BDCT histogram. F5, developed from Jsteg, F3, and F4, employs the following techniques: straddling and matrix coding. Straddling scatters the message as uniformly distributed as possible over a cover image. Matrix coding tends to improve embedding efficiency (defined here as the number of embedded bits per change of the BDCT coefficient). MB embedding tries to make the embedded data correlated to the cover medium. This is implemented by splitting the cover medium into two parts, modeling the parameter of the distribution of the second part given the first part, encoding the second part by using the model and to-be-embedded message, and then combining the two parts to form the stego medium. Specifically, the Cauchy distribution is used to model the JPEG BDCT mode histogram and the embedding attempts to keep the lower precision histogram of the BDCT modes unchanged.

To detect hidden information in a stego image, many steganalysis methods have been proposed. A universal steganalysis method using higher order statistics has been proposed by Farid. See H. Farid, "Detecting hidden messages using higher-order statis-tical models", *International Conference on Image Processing*, Rochester, N.Y., USA, 2002. (hereinafter, "Farid") Quadrature mirror filters are used to decompose a test image into wavelet subbands. The higher order statistics are calculated from wavelet coefficients of high-frequency subbands to form a group of features. Another group of features is similarly formulated from the prediction errors of wavelet coefficients of high-frequency subband. In Y. Q. Shi, G. Xuan, D. Zou, J. Gao, C. Yang, Z. Zhang, P. Chai, W. Chen, C. Chen, "Steganalysis based on moments of characteristic functions using wavelet decomposition, prediction-error image, and neural network," *International Conference on Multimedia and Expo*, Amsterdam, Netherlands, 2005, (hereinafter, "Shi et al.), a described method employs statistical moments of characteristic functions of a test image, its prediction-error image, and their discrete wavelet transform (DWT) subbands as features.

However, steganalysis method specifically designed for addressing JPEG steganographic schemes has been proposed by Fridrich. See J. Fridrich, "Feature-based steganalysis for JPEG images and its implications for future design of steganographic schemes," *6th Information Hiding Workshop*, Toronto, ON, Canada, 2004. With a relatively small-size set of well-selected features, this method outperforms other steganalysis methods, such as those previously mentioned, when detecting images that have hidden data created by OutGuess, F5 and MB. See M. Kharrazi, H. T. Sencar, N. D. Memon, "Benchmarking steganographic and steganalysis techniques", *Security, Steganography, and Watermarking of Multimedia Contents* 2005, San Jose, Calif., USA, 2005.

As suggested above, in contrast to these, an embodiment described herein provides a method based at least in part on statistical moments derived at least in part from image 2-D array and JPEG 2-D array. In this particular embodiment, first order histograms and/or second order histograms may be employed, although in other embodiments higher order histograms may also or alternately be employed, depending, for example, on the application and a host of other possible factors. However, for this embodiment, the moments of 2-D characteristic functions are also therefore utilized for steganalysis.

In this context, steganalysis is considered as a task of two-class pattern recognition. Thus, a test image, for example, may be classified as either a stego image (with hidden data) or as a non-stego image (without hidden data). As described in the previously referenced work, Shi et al., 78-D feature vectors are used in steganalysis, although claimed subject matter is not limited in scope in this respect. Nonetheless, as described in Shi et al., the first half of features are generated based at least in part on a given test image and its 3-level Haar wavelet decomposition. The second half of features are based at least in part on the prediction-error image and its 3-level Haar wavelet decomposition. Denoting the test image and the prediction-error image as the $LL_0$ subbands, provides 26 subbands. The discrete Fourier transform of a histogram of an image is referred to in this context as a characteristic function (CF). Thus, in Shi et al. the CF of these subbands is calculated. The first three absolute moments of these CF's are used to form the 78-D feature vectors. The absolute moments are defined as follows:

$$M_n = \frac{\sum_{i=1}^{N/2} x_i^n |H(x_i)|}{\sum_{i=1}^{N/2} |H(x_i)|}, \quad (1)$$

where $H(x_i)$ is the CF component at frequency $x_i$ and N is the total number of different value level of coefficients in a subband under consideration. A prediction-error image here is the difference between the original image and the prediction image. A prediction is illustrated by (2) below and a 2 by 2 array shown in FIG. 1.

$$\hat{x} = \begin{cases} \max(a, b), & \text{if } c \leq \min(a, b) \\ \min(a, b), & \text{if } c \geq \max(a, b) \\ a + b - c, & \text{otherwise} \end{cases} \quad (2)$$

This particular embodiment departs from this prior approach. For example, as previously suggest, this embodiment now includes statistical moments derived at least in part from a JPEG 2-D array associated with the image. For example, consider a 2-D array generated by applying an 8×8 block DCT to the image followed by quantization using a JPEG quantization table. Note that these quantized JPEG BDCT coefficients may be either positive, or negative, or zero. Therefore, in this embodiment, apply the absolute value to the coefficients, as how by 205 in FIG. 2. This resultant 2-D array is referred to here for this embodiment as a JPEG 2-D array.

Applying the procedure previously referred to from Shi et al. to this JPEG 2-D array results in another set of 78 features. This is illustrated in part by block diagram 200 of FIG. 2 and processing illustrated as being applied to a frequency domain representation of the image, here a block DCT representation. For this embodiment, the moments of the CF's are defined as in Equation (1), where N is the total number of different absolute values of JPEG quantized BDCT coefficients in a subband under consideration, although claimed subject matter is not limited in scope in this respect. In this particular embodiment, computing a prediction-error 2-D array from the JPEG 2-D array, however, is not precisely the same as computing a predication error 2-D array for the image. For those zero elements in the JPEG 2-D array, prediction values for zero element in the JPEG 2-D array are set as zero, as shown in Equation (3). Thus, in this embodiment, zero DCT coefficients remain zero in the prediction-error 2-D array. Furthermore, an absolute-value operation is applied to produce a prediction error 2-D array, as shown by 215 of FIG. 2.

$$\hat{x} = \begin{cases} 0, & \text{if } x = 0 \\ \max(a, b), & \text{if } c \leq \min(a, b) \\ \min(a, b), & \text{if } c \geq \max(a, b) \\ a + b - c, & \text{otherwise.} \end{cases} \quad (3)$$

Modern steganographic schemes, such as OutGuess and MB, try to keep a histogram change as slight as possible in order to resist identification or detection. For instance, MB embedding attempts to keeps the lower precision histogram of the BDCT modes relatively unchanged. Thus; higher order histograms and moments may be useful in this context.

A second-order histogram may provide a measure of the joint occurrence of pairs of pixels separated by a specified distance and orientation. Denote the distance by ρ, and the angle with respect to the horizontal axis by θ. The second-order histogram is defined as $$h_d(j_1, j_2; \rho, \theta) = \frac{N(j_1, j_2; \rho, \theta)}{N_T(\rho, \theta)}, \quad (4)$$

where $N(j_1,j_1;\rho,\theta)$ is the number of pixel pairs for which the first pixel value is $j_1$ while the second pixel value is $j_2$, and $N_T(\rho,\theta)$ is the total number of pixel pairs in the image with separation $(\rho,\theta)$. A second-order histogram may also be used in JPEG 2-D array, although claimed subject matter is not limited in scope in this respect. A second-order histogram corresponds to a 2-D array, often called dependency matrix or co-occurrence matrix.

Figure 2:
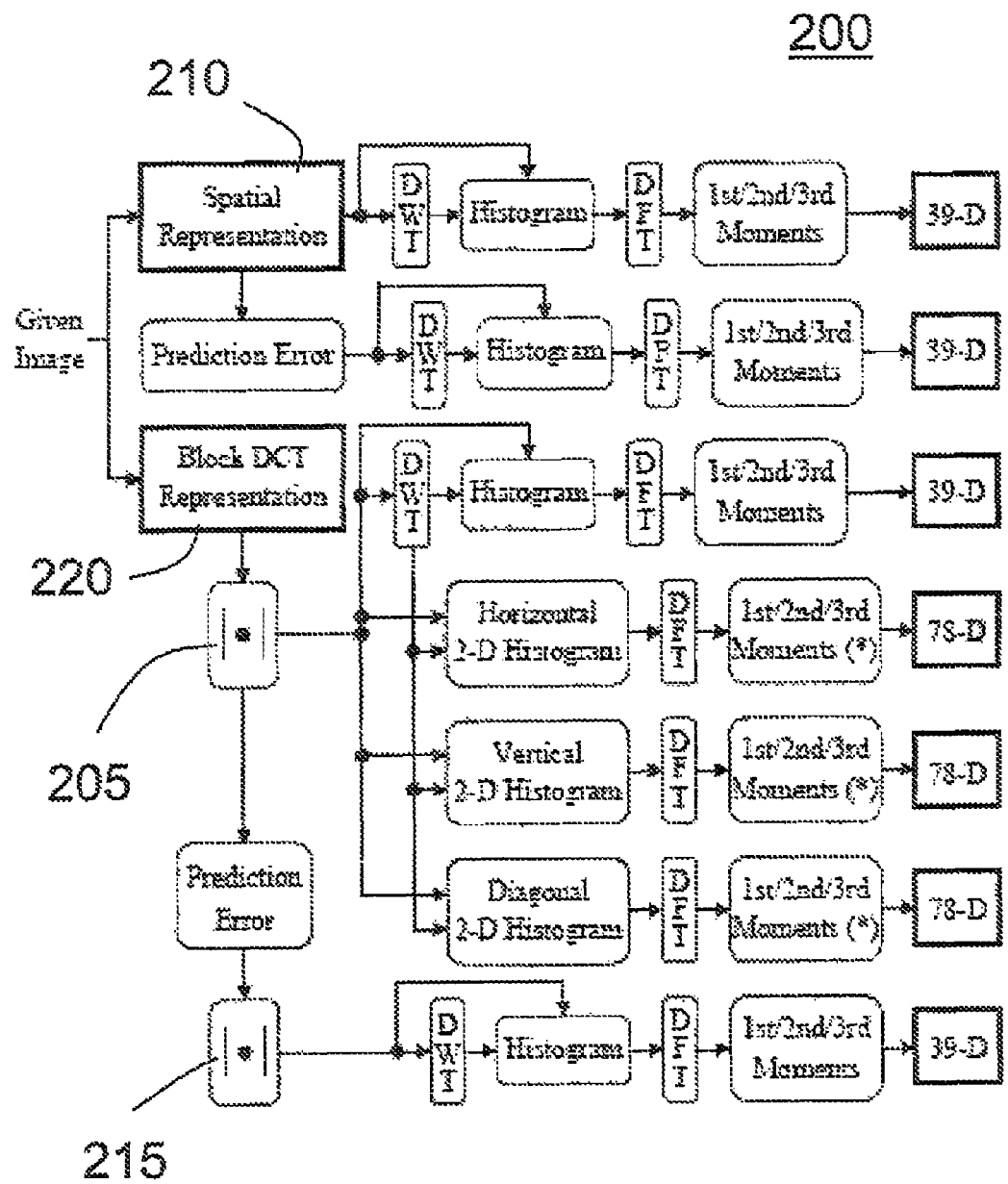
FIG. 2 is a block diagram illustrating an embodiment of feature generation.

For a wavelet subband derived at least in part from a JPEG 2-D array, three second-order histograms are generated with the following three separations:

$$(\rho, \vartheta) = \left\{(1, 0), \left(1, -\frac{\pi}{2}\right), \left(1, -\frac{\pi}{4}\right)\right\}, \quad (5)$$

which are referred to here as a horizontal 2-D histogram, a vertical 2-D histogram, and a diagonal 2-D histogram, respectively. For example, looking at FIG. 1, the pair (x, a), (x, b), (x, c) are separated by (1, 0), (1,−π/2), and (1,−π/4), respectively. After applying a 2-D DFT to the second-order histograms to obtain 2-D CF's, the two marginal moments of 2-D CF's may be calculated by $$M_{u,n} = \frac{\sum_{j=1}^{N/2}\sum_{i=1}^{N/2} u_i^n |H(u_i, v_j)|}{\sum_{j=1}^{N/2}\sum_{i=1}^{N/2} |H(u_i, v_j)|}, \quad (6)$$

$$M_{v,n} = \frac{\sum_{i=1}^{N/2}\sum_{j=1}^{N/2} v_j^n |H(u_i, v_j)|}{\sum_{i=1}^{N/2}\sum_{j=1}^{N/2} |H(u_i, v_j)|}, \quad (7)$$

where $H(u_i,v_j)$ is the 2-D CF component at frequency $(u_i,v_j)$ and N is the total number of different absolute values of coefficients in a subband under consideration. For a direction, we can generate two marginal moments according to Equations (6) and (7), we thus have, in this embodiment, an additional 78×3=234 feature components. Hence, for this embodiment, we have 390-D feature vectors, as shown in FIG. 2, although claimed subject matter is not limited in scope in this respect.

A variety of techniques are available to analyze data, here referred to as features, in a variety of contexts. In this context, we use the term "analysis of variance process" to refer to processes or techniques that may be applied so that differences attributable to statistical variation are sufficiently distinguished from differences attributable to non-statistical variation to correlate, segment, classify, analyze or otherwise characterize data based at least in part on application of such processes or techniques. Examples, without intending to limit the scope of claimed subject matter includes: artificial intelligence techniques and processes, including pattern recognition; neutral networks; genetic processes; heuristics; and support vector machines (SVM).

Although claimed subject matter is not limited in scope to SVM or SVM processes, it may be a convenient approach for two-class classification. See, for example, C. Cortes and V. Vapnik, "Support-vector networks," in Machine Learning, 20, 273-297, Kluwer Academic Publishers, 1995. SVM may, for example, be employed to handle linear and non-linear cases or situations. For linearly separable cases, for example, an SVM classifier may be applied to search for a hyper-plane that separates a positive pattern from a negative pattern. For a non-linearly separable case, a "learning machine" may map input feature vectors to a higher dimensional space in which a linear hyper-plane may potentially be located. In this embodiment, a transformation from non-linear feature space to linear higher dimensional space may be performed using a kernel function. Examples of kernels include: linear, polynomial, radial basis function and sigmoid. For this particular embodiment, a linear kernel may be employed in connection with a linear SVM process, for example. Likewise, other kernels may be employed in connection with a non-linear SVM process.

Thus, while Shi et al. employed neural networks, for this embodiment a support vector machine (SVM) is used as a classifier. This particular embodiment, as described below, employs a polynomial kernal, although, again, claimed subject matter is not limited in scope in this respect.

Having formulated an embodiment system for identifying or classifying marked content, such as images, for example, it is desirable to construct and evaluate performance. However, again, we note that this is merely a particular embodiment for purposes of illustration and claimed subject matter is not limited in scope to this particular embodiment or approach.

An image database comprising 7,560 JPEG images with quality factors ranging from 70 to 90 was employed. One third of these images were an essentially random set of pictures taken at different times and place's with different digital cameras. The other two thirds were downloaded from the Internet. Each image was cropped (central portion) to the size of either 768×512 or 512×768.

This performance evaluation is focused on detecting Outguess, F5, and MB1 steganography. The codes for these three approaches are publicly available. See http://www.outguess.org/; http://wwwm.inf.tu-dresden.de/~westfeld/f5.html; http://redwood.ucdavis.edu/phil/papers/iwdw03.htm. Since there are quite a few zero BDCT coefficients in the JPEG images and the quantity of zero coefficients vanes, the data embedding capacity differs from image to image. A common practice is to use the ratio between the length of hidden data and the number of non-zero BDCT AC coefficients as the measure of data embedding capacity for JPEG images. For OutGuess, 0.05, 0.1, and 0.2 bpc (bits per non-zero BDCT AC coefficient) were embedded. The resultant numbers of stego image were 7498, 7452, and 7215, respectively. For F5 and MB1, 0.05, 0.1, 0.2, and 0.4 bpc were embedded, which provides 7560 stego images. Note that the step size of MB1 embedding equals to two for this evaluation.

One half of the images (and the associated stego image) were randomly selected to train the SVM classifier and the remaining pairs were employed to evaluate the trained classifier. Approaches previously discussed, such as Farid's, Shi et al.'s, Fridrich's, as well the previously described embodiment were applied to evaluation detection of OutGuess, F5 and MB schemes. The results shown in Table 1 are the arithmetic average of 20 random experiments.

TABLE 1

|  | bpc | Farid's | | | Shi et al.'s | | | Fridrich's | | | Our Proposed | | |
|---|---|---|---|---|---|---|---|---|---|---|---|---|---|
|  |  | TN | TP | AR | TN | TP | AR | TN | TP | AR | TN | TP | AR |
| OG | 0.05 | 59.0 | 57.6 | 58.3 | 55.6 | 58.5 | 57.0 | 49.8 | 75.4 | 62.6 | 71.2 | 70.8 | 71.0 |
| OG | 0.1 | 70.0 | 63.5 | 66.8 | 61.4 | 66.3 | 63.9 | 68.9 | 83.3 | 76.1 | 84.3 | 87.3 | 85.8 |
| OG | 0.2 | 81.9 | 75.3 | 78.6 | 72.4 | 77.5 | 75.0 | 90.0 | 93.6 | 91.8 | 93.0 | 95.6 | 94.3 |
| F5 | 0.05 | 55.6 | 45.9 | 50.8 | 57.9 | 45.0 | 51.5 | 46.1 | 61.0 | 53.2 | 54.4 | 53.8 |
| F5 | 0.1 | 55.5 | 48.4 | 52.0 | 54.6 | 54.6 | 54.6 | 58.4 | 63.3 | 60.8 | 58.8 | 61.6 | 60.2 |
| F5 | 0.2 | 55.7 | 55.3 | 55.5 | 59.5 | 63.3 | 61.4 | 77.4 | 77.2 | 77.3 | 72.8 | 76.2 | 74.5 |
| F5 | 0.4 | 62.7 | 65.0 | 63.9 | 71.5 | 77.1 | 74.3 | 92.6 | 93.0 | 92.8 | 89.9 | 92.3 | 91.1 |
| MB1 | 0.05 | 48.5 | 53.2 | 50.8 | 57.0 | 49.2 | 53.1 | 39.7 | 66.9 | 53.3 | 65.2 | 59.0 | 62.1 |
| MB1 | 0.1 | 51.9 | 52.3 | 52.1 | 57.6 | 56.6 | 57.1 | 45.6 | 70.1 | 57.9 | 74.9 | 75.7 | 75.3 |
| MB1 | 0.2 | 52.3 | 56.7 | 54.5 | 63.2 | 66.7 | 65.0 | 58.3 | 77.5 | 67.9 | 86.8 | 90.6 | 88.7 |
| MB1 | 0.4 | 55.3 | 63.6 | 59.4 | 74.2 | 80.0 | 77.1 | 82.9 | 86.8 | 84.8 | 94.2 | 97.0 | 95.6 |

Please note that for table 1 the units are %; OG stands for OutGuess, TN stands for true negative rate, TP stands for true positive rate, and AR stands for accuracy.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive. For example, a display may be employed to display one or more queries, such as those that may be interrelated, and or one or more tree expressions, although, again, claimed subject matter is not limited in scope to this example.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

The invention claimed is:

1. A method of classifying an image comprising:
generating, in a device configured to process images, features based at least in part on a block frequency domain representation of said image, wherein at least one of said features is based at least in part on a prediction error image, wherein generating the features includes transforming the prediction error image and applying a histogram operation to a result of the transforming of the prediction error image; and
classifying said image based at least in part on said generated features.

2. The method of claim 1, wherein said classifying comprises determining if the image is a stego or non-stego image.

3. The method of claim 1, wherein said block frequency domain representation comprises a block discrete cosine transform (DCT) representation.

4. The method of claim 3, wherein said block DCT representation comprises a two-dimensional JPEG array of said image.

5. The method of claim 1, wherein said classifying comprises applying a trained classifier to said generated features, wherein the trained classifier is trained based on features generated from a set of test images.

6. The method of claim 1, wherein said transforming the prediction error image comprises applying a discrete wavelet transform to the prediction error image.

7. The method of claim 1, wherein the prediction error image is formed based on a spatial representation of the image.

8. The method of claim 1, wherein the prediction error image is formed based on a block DCT representation of the image.

9. The method of claim 1, wherein said generating further comprises applying an absolute value operation to the prediction error image prior to said applying a histogram operation.

10. An article comprising:
a non-transitory computer-readable medium having stored thereon instructions that, upon execution by a computing device, result in operations comprising:
generating features based at least in part on a block frequency domain representation of an image, wherein at least one of said features is based at least in part on a prediction error image, the features includes transforming the prediction error image and applying a histogram operation to a result of the transforming of the prediction error image; and classifying said image based at least in part on said generated features.

11. The article of claim 10, wherein said classifying comprises determining if the image is a stego or non-stego image.

12. The article of claim 10, wherein said block frequency domain representation comprises a block discrete cosine transform (DCT) representation.

13. The article of claim 12, wherein said block DCT representation comprises a two-dimensional JPEG array of said image.

14. The article of claim 10, wherein said classifying comprises applying a trained classifier to said generated features, wherein the trained classifier is trained based on features generated from a set of test images.

15. The article of claim 10, wherein said transforming the prediction error image comprises applying a discrete wavelet transform to the prediction error image.

16. The article of claim 10, wherein the prediction error image is formed based on a spatial representation of the image.

17. The article of claim 10, wherein the prediction error image is formed based on a block DCT representation of the image.

18. The article of claim 10, wherein said generating further comprises applying an absolute value operation to the prediction error image prior to said applying a histogram operation.

19. An apparatus comprising:
    means for generating classification features based at least in part on a block frequency domain representation of said image, wherein at least one of said features is based at least in part on a prediction error image, wherein the means for generating the features includes means for transforming the prediction error image and means for applying a histogram operation to a result of the transforming of the prediction error image; and
    means for classifying said image based at least in part on said generated classification features.

20. The apparatus of claim 19, wherein said means for classifying comprises means for determining if the image is a stego or non-stego image.

21. The apparatus of claim 19, wherein said block frequency domain representation comprises a block discrete cosine transform (DCT) representation.

22. The apparatus of claim 21, wherein said block DCT representation comprises a two-dimensional JPEG array of said image.

23. The apparatus of claim 19, wherein said means for classifying comprises means for applying a trained classifier to said generated features, wherein the trained classifier is trained based on features generated from a set of test images.

24. The apparatus of claim 19, wherein said means for transforming the prediction error image comprises means for applying a discrete wavelet transform to the prediction error image.

25. The apparatus of claim 19, wherein the prediction error image is formed based on a spatial representation of the image.

26. The apparatus of claim 19, wherein the prediction error image is formed based on a block DCT representation of the image.

27. The apparatus of claim 19, wherein said means for generating further comprises means for applying an absolute value operation to the prediction error image prior to said means for applying a histogram operation.

28. An apparatus for analyzing an image, comprising:
    a frequency domain transformer configured to process the image and provide a block frequency domain representation of the image;
    at least one statistical moment generator configured to generate a first set of image features based at least in part on the block frequency domain representation, wherein at least one of the first set of features is based at least in part on a prediction error image, wherein the at least one statistical moment generator is configured to transform the prediction error image and to form at least one histogram from a result of the transforming of the prediction error image; and
    a classifier configured to classify the image based at least in part of the first set of image features.

29. The apparatus of claim 28, wherein said classifier is configured to determine if the image is a stego or non-stego image.

30. The apparatus of claim 28, wherein said block frequency domain representation comprises a block discrete cosine transform (DCT) representation.

31. The apparatus of claim 30, wherein said block DCT representation comprises a two-dimensional JPEG array of said image.

32. The apparatus of claim 28, wherein said classifier is configured to be trained based on features generated from a set of test images.

33. The apparatus of claim 28, wherein said at least one statistical moment generator is configured to transform the prediction error image by applying a discrete wavelet transform to the prediction error image.

34. The apparatus of claim 28, wherein the prediction error image is formed based on a spatial representation of the image.

35. The apparatus of claim 28, wherein the prediction error image is formed based on a block DCT representation of the image.

36. The apparatus of claim 28, wherein said at least one statistical moment generator is further configured to apply an absolute value operation to the prediction error image prior to applying a histogram operation.

* * * * *

UNITED STATES PATENT AND TRADEMARK OFFICE
CERTIFICATE OF CORRECTION

PATENT NO.        : 8,103,054 B2
APPLICATION NO.   : 12/897505
DATED             : January 24, 2012
INVENTOR(S)       : Shi et al.

It is certified that error appears in the above-identified patent and that said Letters Patent is hereby corrected as shown below:

Title Page, item (75), under "Inventors", in Column 1, Line 2, delete "Chunhua Chen," and insert -- ChunHua Chen, --.

Page 2, item (56), under "Other Publications", in Column 1, Line 1, delete "JPED" and insert -- JPEG --.

Column 1, lines 9-10, delete "continuation of co-pending U.S. patent application" and insert -- continuation of U.S. patent application --.

Signed and Sealed this
Third Day of July, 2012

David J. Kappos
*Director of the United States Patent and Trademark Office*